(12) United States Patent
Yoshida

(10) Patent No.: US 9,274,925 B2
(45) Date of Patent: Mar. 1, 2016

(54) PROGRAMMABLE SYMBOLIC EXECUTION BASED DYNAMIC CHECKER

(71) Applicant: FUJITSU LIMITED, Kawasaki-shi, Kanagawa (JP)

(72) Inventor: Hiroaki Yoshida, Cupertino, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 13/874,280

(22) Filed: Apr. 30, 2013

(65) Prior Publication Data

US 2014/0325489 A1    Oct. 30, 2014

(51) Int. Cl.
- *G06F 9/44* (2006.01)
- *G06F 9/45* (2006.01)
- *G06F 11/36* (2006.01)
- *G06F 11/34* (2006.01)

(52) U.S. Cl.
CPC ........ *G06F 11/3604* (2013.01); *G06F 11/3466* (2013.01); *G06F 8/47* (2013.01); *G06F 8/52* (2013.01)

(58) Field of Classification Search
CPC ............. G06F 8/47; G06F 8/52; G06F 8/443; G06F 11/3466; G06F 2201/865; G06F 9/45504; G06F 9/45516
See application file for complete search history.

(56) References Cited

U.S. PATENT DOCUMENTS

| | | | | |
|---|---|---|---|---|
| 5,784,553 | A * | 7/1998 | Kolawa et al. | 714/38.1 |
| 6,481,008 | B1 * | 11/2002 | Chaiken et al. | 717/158 |
| 8,732,670 | B1 * | 5/2014 | Daudel et al. | 717/127 |
| 8,769,518 | B1 * | 7/2014 | Daudel et al. | 717/166 |
| 8,819,649 | B2 * | 8/2014 | Lafreniere et al. | 717/139 |
| 8,954,935 | B2 * | 2/2015 | Kew et al. | 717/130 |
| 2003/0145309 | A1 * | 7/2003 | Inamdar | 717/118 |
| 2005/0028132 | A1 * | 2/2005 | Srinivasamurthy et al. | 717/100 |
| 2006/0218533 | A1 * | 9/2006 | Koduru et al. | 717/124 |
| 2009/0064114 | A1 * | 3/2009 | Bottomley et al. | 717/148 |
| 2010/0058256 | A1 * | 3/2010 | El-Zein et al. | 716/2 |
| 2011/0088016 | A1 * | 4/2011 | Ball et al. | 717/128 |
| 2011/0161937 | A1 * | 6/2011 | Bounimova et al. | 717/131 |
| 2012/0084759 | A1 * | 4/2012 | Candea et al. | 717/126 |
| 2014/0237458 | A1 * | 8/2014 | Elias et al. | 717/148 |
| 2014/0245275 | A1 * | 8/2014 | Elias et al. | 717/168 |

OTHER PUBLICATIONS

Zhao et al., "Formalizing the LLVM Intermediate Representation for Verified Program Transformation", 2012 ACM, POPL'12, Jan. 25-27, 2012, Philadelphia, PA, USA, pp. 1-13; <http://dl.acm.org/results.cfm?h=1&cfid=478985936&cftoken=62466661>.*

Nagarakatte et al., "SoftBound: Highly Compatible and Complete Spatial Memory Safety for C", 2009 ACM, PLDI'09, Jun. 15-20, 2009, Dublin, Ireland, pp. 245-258; <http://dl.acm.org/citation.cfm?id=1542476.1542504&coll=DL&dl=GUIDE&CFID=478985936&CFTOKEN=62466661>.*

(Continued)

*Primary Examiner* — Thuy Dao
*Assistant Examiner* — Ben C Wang
(74) *Attorney, Agent, or Firm* — Maschoff Brennan

(57) ABSTRACT

A method of analyzing a software program includes compiling the software program into an intermediate representation. The method also includes finding an instruction in the intermediate representation that matches a pattern in a check pattern. The method also includes generating an instrumented intermediate representation in which the instruction is modified according to an action specified in the check pattern. The method also includes symbolically executing the instrumented intermediate representation.

16 Claims, 7 Drawing Sheets

(56) References Cited

OTHER PUBLICATIONS

Ge et al., "DyTa: Dynamic Symbolic Execution Guided with Static Verification Results", 2011 ACM, ICSE'11, May 21-28, 2011, Waikiki, Honolulu, HI, USA, pp. 1-3; <http://dl.acm.org/results.cfm?h=1&cfid=526558156&cftoken=33505277>.*

Martin et al., "Finding Application Errors and Security Flaws Using PQL: a Program Query Language", 2015 ACM, OOPSLA'05, Oct. 16-20, 2005, pp. 1-19; <http://dl.acm.org/results.cfm?h=1&cfid=554806370&cftoken=65865975>.*

Agosta et al., "Automated Security Analysis of Dynamic Web Applications through Symbolic Code Execution", Apr. 2012, IEEE, pp. 189-194; <http://ieeexplore.ieee.org/stamp/stamp.jsp?tp=&arnumber=6209165>.*

Sapra et al., "Finding Errors in Python Programs Using Dynamic Symbolic Execution", Springer Berlin Heidelberg, IFIP, ICTSS Nov. 2013, LNCS 8254, pp. 283-289; <http://link.springer.com/chapter/10.1007%2F978-3-642-41707-8_20>.*

* cited by examiner

PROGRAMMABLE SYMBOLIC EXECUTION BASED DYNAMIC CHECKER

FIELD

The embodiments discussed herein are related to a programmable symbolic execution based dynamic checker.

BACKGROUND

Dynamic checkers are used to check for the presence of various kinds of errors in software programs, such as assertion failures or violations, memory errors, and divide-by-zero errors to name a few. Examples of popular tools with dynamic checker functionality include some memory analyzers, profilers, and coverage analyzers.

In a typical implementation, a dynamic checker analyzes a software program by executing the software program using a test suite including one or more concrete inputs. The concrete inputs are identified and provided manually by a user. To detect errors, a user has to provide concrete inputs that trigger the errors. Accordingly, it is difficult to maintain a high-quality test suite which exercises sufficiently many paths in the software program and which catches corner-case bugs.

Symbolic execution is a technique for dynamically analyzing a software program. Symbolic execution uses as input values symbolic values instead of actual data and represents values of program variables as symbolic expressions. As a result, the outputs computed by a software program that is symbolically executed are expressed as a function of the symbolic inputs. Through symbolic execution, each path within a software program may be symbolically executed.

Some dynamic checkers implement symbolic execution, and may be referred to as symbolic execution based dynamic checkers. Conventional symbolic execution based dynamic checkers have limited defect detection, such as detection of simple memory errors including null pointer errors and out-of-bound access errors. Moreover, the detectable types of defects in conventional symbolic execution based dynamic checkers are hardcoded such that users are unable to easily change the types of defects that are detected.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of analyzing a software program includes compiling the software program into an intermediate representation. The method also includes finding an instruction in the intermediate representation that matches a pattern in a check pattern. The method also includes generating an instrumented intermediate representation in which the instruction is modified according to an action specified in the check pattern. The method also includes symbolically executing the instrumented intermediate representation.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
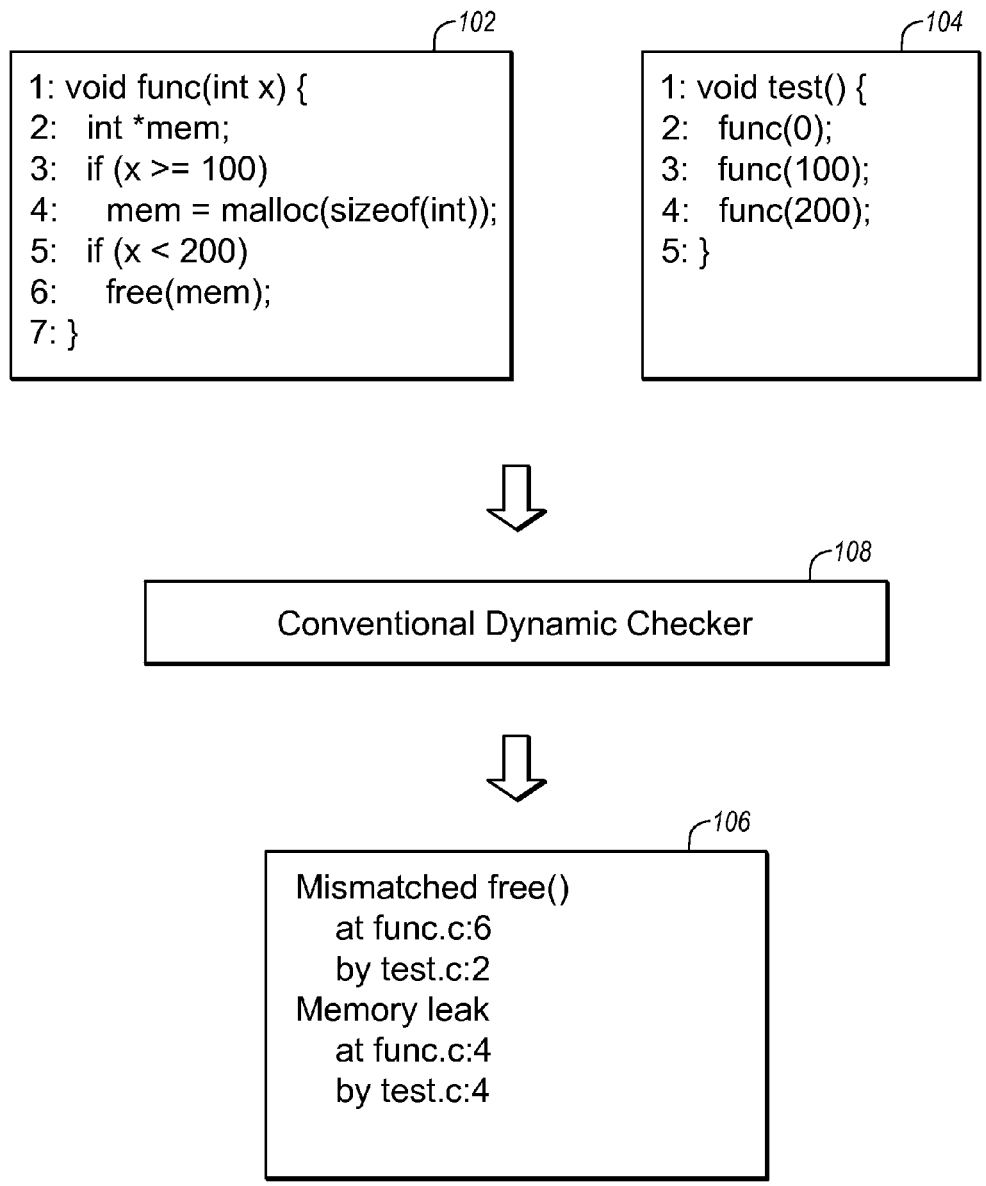
FIG. 1 illustrates an example function, a corresponding test function, and a corresponding error report generated by a conventional dynamic checker.

FIG. 1 illustrates an example function 102, a corresponding test function 104, and a corresponding error report 106 generated by a conventional dynamic checker 108. In more detail, the example function 102 may be part of a software program that is being tested for errors and may be referred to as "func.c." A test suite (not shown) includes various concrete inputs manually provided by a user to test the function 102. The test function 104 includes the concrete inputs including values of 0, 100, and 200 that are to be passed into the function 102 and may be referred to as "test.c." Because the function 102 includes two "if" statements, the test function 104 includes three concrete inputs to traverse all possible paths in the function 102.

In operation, the conventional dynamic checker 108 executes the test function 104, including calling the function 102 with each of the concrete inputs as arguments. When func(0) is called by the test function 104, the first "if" statement at line 3 of the function 102 is skipped, and the second "if" statement at line 5 if the function is executed. Func(0) produces a memory error since execution of the second "if" statement without executing the first "if" statement frees unallocated memory. Accordingly, the conventional dynamic checker 108 generates the error report 106 identifying the error (e.g., "Mismatched free( )"), line 6 of the function 102 at which the error occurs (e.g., "at func.c:6"), and line 2 of the test function 104 that caused the error (e.g., "by test.c:2").

Func(100) and func(200) are also called by the test function 104, and from the error report 106 it may be seen that func(200) results in a memory leak error.

As illustrated by the foregoing example, it takes three appropriately selected concrete inputs to execute all paths and catch the corner-case bugs of the relatively simple function 102. Such concrete inputs are typically identified manually by a user, e.g., the programmer of the function 102. For more complex functions and/or programs involving numerous functions, it may be complicated, time-consuming, and/or error-prone for the user to identify sufficient and appropriate concrete inputs to execute all paths and/or catch all corner-case bugs.

Accordingly, some embodiments discussed herein are related to a programmable symbolic execution based dynamic checker. In some embodiments, the programmable symbolic execution based dynamic checker may be configured to analyze software programs without providing concrete inputs, thereby eliminating the time and effort involved in manually identifying concrete inputs and improving the likelihood that all errors will be identified.

Embodiments of the present invention will be explained with reference to the accompanying drawings.

Figure 2:
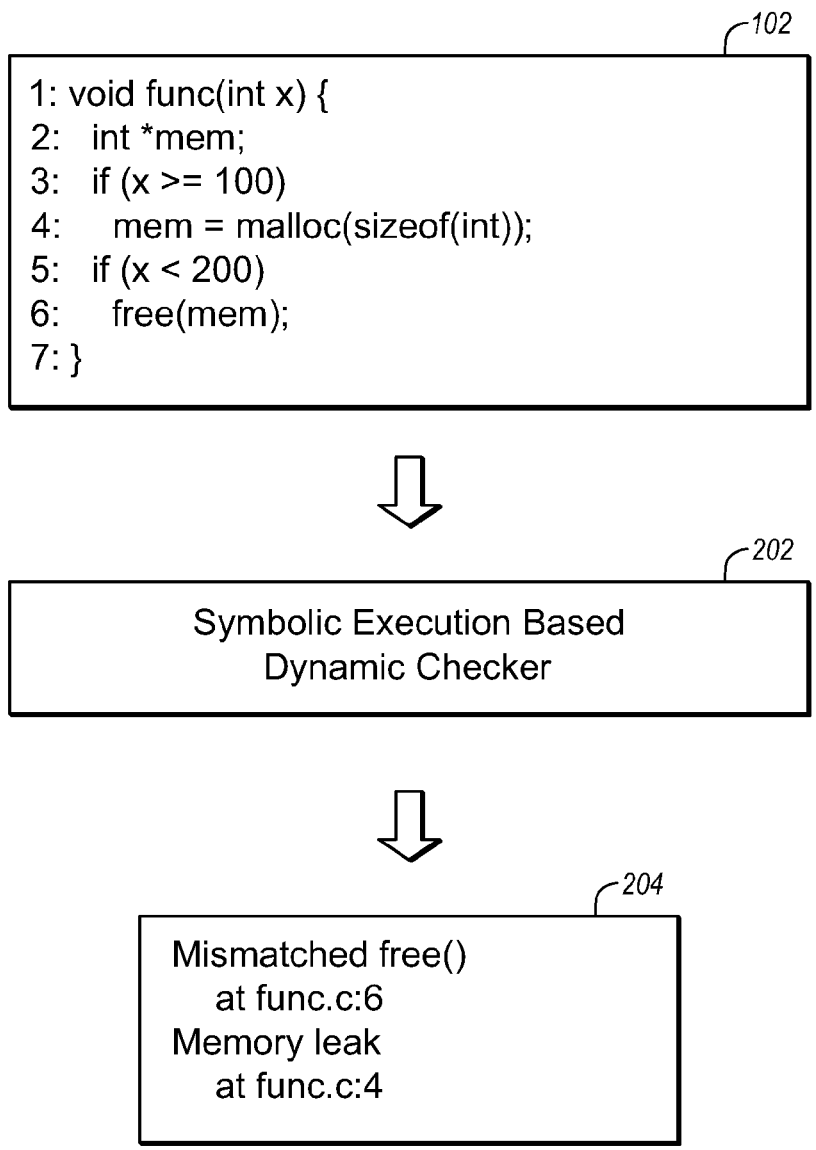
FIG. 2 illustrates the example function of FIG. 1 and a corresponding error report generated by a symbolic execution based dynamic checker.

FIG. 2 illustrates the example function 102 of FIG. 1 and a corresponding error report 204 generated by a symbolic execution based dynamic checker 202 (hereinafter "checker 202"), arranged in accordance with at least one embodiment described herein. In general, the checker 202 may be configured to instrument a target program, e.g., the function 102, by inserting assertions according to one or more patterns, which may include default patterns and/or patterns specified by users. In some embodiments, the instrumentation is performed on an intermediate representation of the target program, such as a compiled version of the target program. Accordingly, the instrumentation may be language-independent.

In an example embodiment, for instance, the checker 202 may compile the function 102, or a software program including the function 102, into an intermediate representation. The checker 202 may search for and find instructions in the intermediate representation that match patterns in corresponding check patterns. The checker 202 may generate an instrumented intermediate representation in which the matched instructions are modified according to actions specified in the corresponding check patterns. For example, the instructions may be replaced by replacement instructions that include calls to corresponding error reports as described in more detail below. The checker 202 may then symbolically execute the instrumented intermediate representation and may generate a report, such as the error report 204, that indicates one or more errors within the function 102, or more generally within the corresponding software program.

Figure 3:
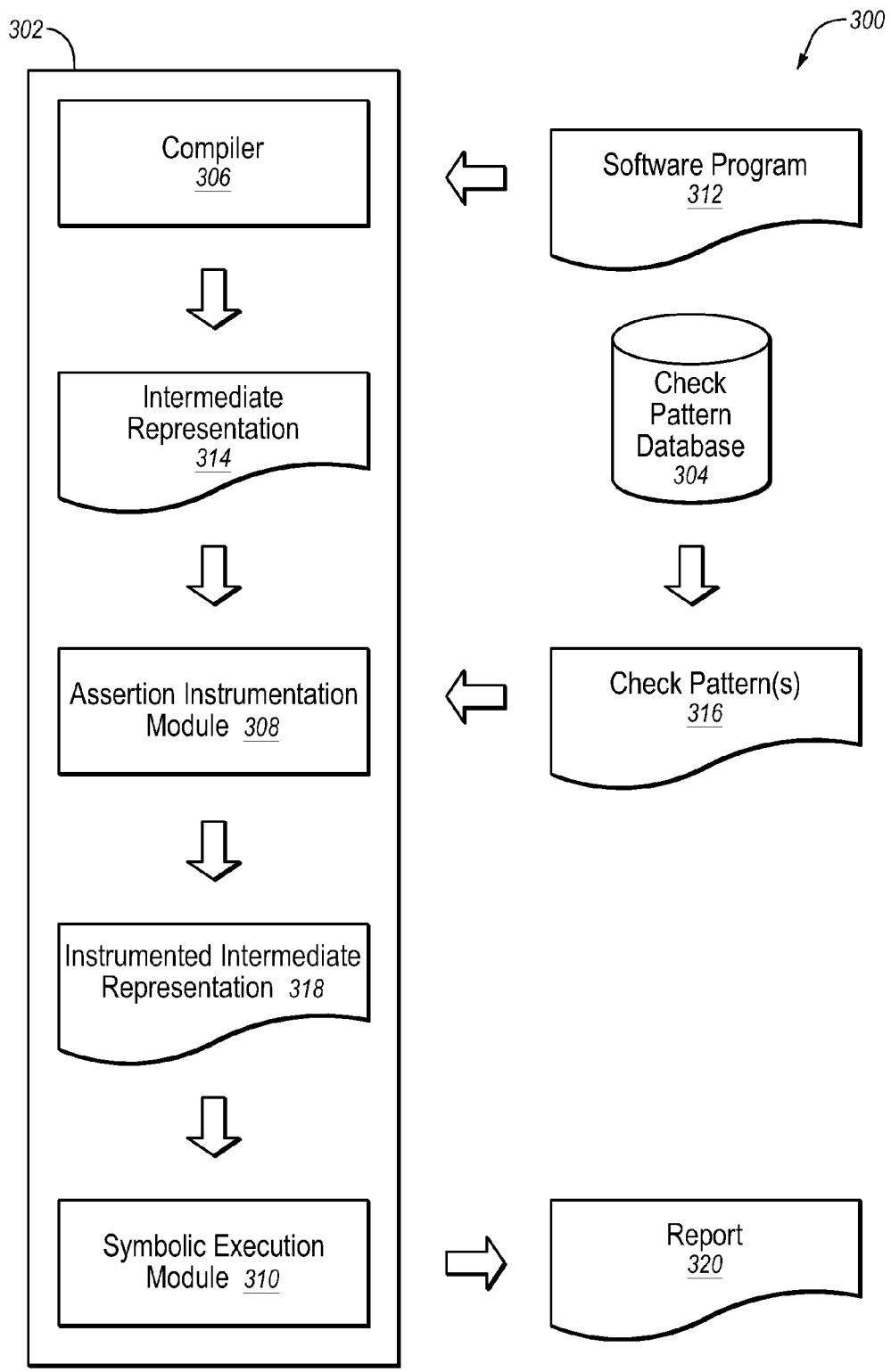
FIG. 3 is a block diagram of an example system for analyzing software programs.

FIG. 3 is a block diagram of an example system 300 for analyzing software programs, arranged in accordance with at least one embodiment described herein. The system 300 may be included in and/or may operate with a software editor to analyze software programs as described herein. The system 300 includes a symbolic execution based dynamic checker 302 (hereinafter "checker 302") and a check pattern database 304. The checker 302 is an example embodiment of the checker 202 of FIG. 2.

The checker 302 may include a compiler 306, an assertion instrumentation module 308, and a symbolic execution module 310. The checker 302, including the compiler 306, the assertion instrumentation module 308, and the symbolic execution module 310 may be implemented in software, hardware, or any combination thereof. In an example embodiment, the compiler 306, the assertion instrumentation module 308, and the symbolic execution module 310 are implemented as computer instructions stored on a non-transitory computer-readable medium, such as memory, that are executable by a processing device to perform the functions and operations described herein. Accordingly, although not illustrated in FIG. 3, the system 300 may further including a non-transitory computer-readable medium, a processing device, and/or other hardware.

The system 300 may be configured to receive a software program 312 generally including high-level software code. The high-level software code of the software program 312 may generally include software code in a human-readable format, such as text. For instance, the high-level software code of the software program 312 may be written in any one of various types of software programming languages, including, but not limited to, Perl, C, C++, C#, Java, JavaScript, Python, Ruby, assembly language, Fortran, COBOL, SQL, and PHP. The software program 312 may be received from a software editor or from some other source.

The compiler 306 may be configured to receive the software program 312 and to compile it into an intermediate representation 314. Compiling the software program 312 may generally include parsing the software program 312, determining whether the parsed software program 312 is syntactically correct and translating the syntactically correct and parsed software program 312 into the intermediate representation 314. The intermediate representation may generally include software code in a machine-readable format, including, but not limited to, byte code, object code, machine code, virtual instructions, LLVM, and other intermediate representations of machine code.

The assertion instrumentation module 308 may be configured to receive the intermediate representation 314 and to instrument the intermediate representation. More particularly, the assertion instrumentation module 308 may be configured to find one or more instructions in the intermediate representation 314 that each match a corresponding pattern in a corresponding check pattern 316. The assertion instrumentation module 308 may be further configured to generate an instrumented intermediate representation 318 in which the matched instructions are each modified according to an action specified in the corresponding check pattern 316. Additional details regarding the check patterns 316 are described below.

The symbolic execution module 310 may be configured to receive the instrumented intermediate representation 318 from the assertion instrumentation module 308 and to symbolically execute the instrumented intermediate representation 318. In some embodiments, the instrumented intermediate representation 318 may be in symbolic form and thus ready for symbolic execution by the symbolic execution module 310. Alternately, the symbolic execution module 310 may translate the instrumented intermediate representation 318 into symbolic form before or currently with the symbolic execution of the instrumented intermediate representation.

By symbolically executing the instrumented intermediate representation 318, the symbolic execution module 310 may analyze a portion of, a majority of, or all of the paths within the instrumented intermediate representation 318. Based on the analysis of the paths within the instrumented intermediate representation 318, the symbolic execution module 310 may be configured to identify errors within the instrumented intermediate representation 318. The errors may include logical errors, accessing of illegal memory locations such as null pointer access, uninitialized pointers, divide by zero, out-of-bounds memory access, memory leaks where memory is allocated but never de-allocated, freeing unallocated memory, among others, as well as user-defined errors. The identified errors may be collected and output in a report 320. In some embodiments, the report 320 may be presented to a user, e.g., a programmer, that has developed and/or is testing the software program 312. For example, the report 320 or a portion thereof may be displayed in a status window of a software editor.

As indicated above, each of the check patterns 316 may include both a pattern and an action. In general, the pattern defines a relationship between two or more arguments while the action specifies a condition. The action may additionally specify a replacement instruction to substitute for an instruction in the intermediate representation 314 when the instruction includes two or more arguments having the relationship specified by the pattern and the condition is satisfied.

Figure 4:
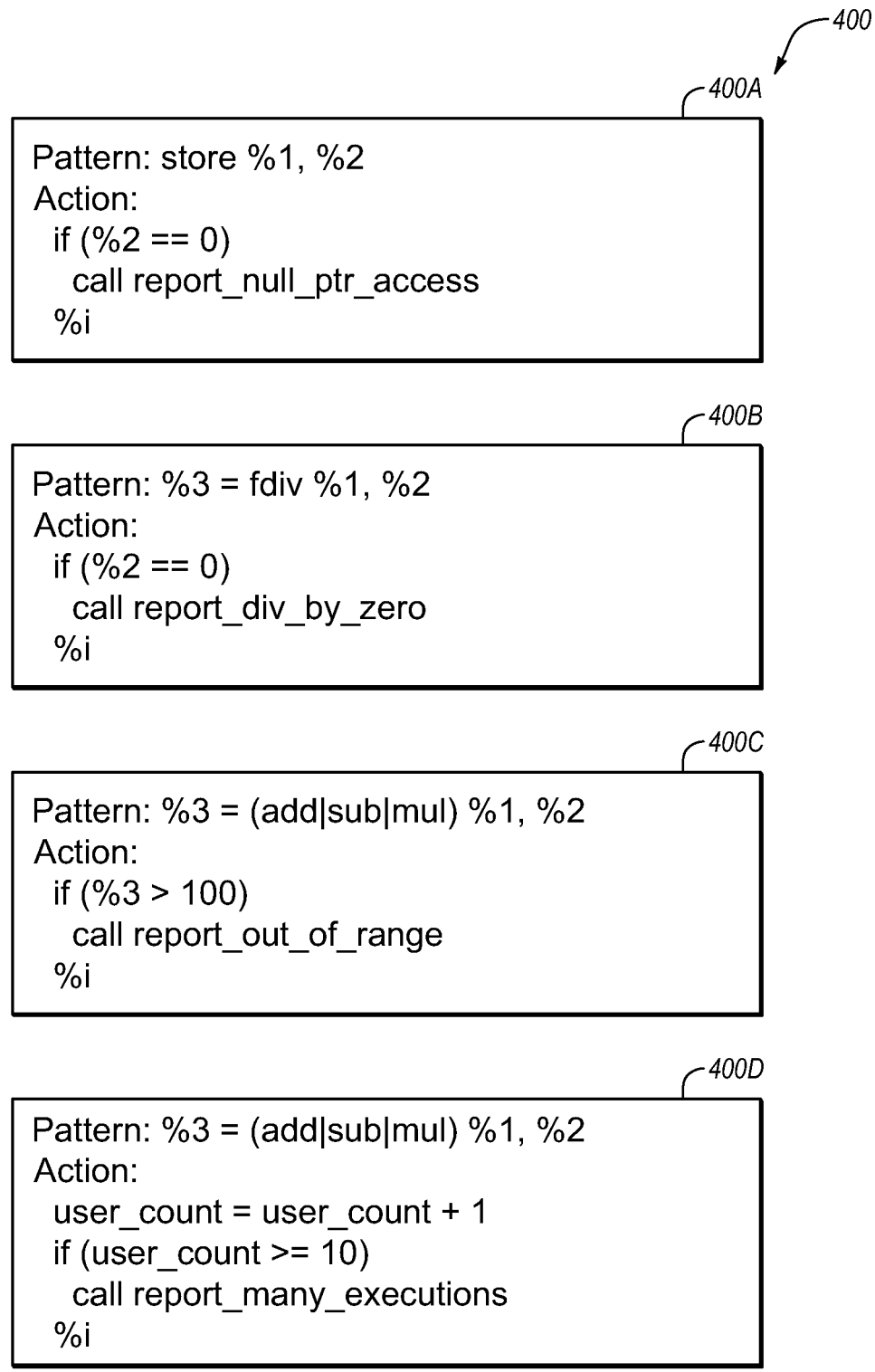
FIG. 4 illustrates various example check patterns that may be implemented in the system of FIG. 3.

FIG. 4 illustrates various example check patterns 400 that may be implemented in the system 300 of FIG. 3, arranged in accordance with at least one embodiment described herein. The check patterns 400 include check patterns 400A-400D.

The check pattern 400A may be configured to check for null pointer access. Accordingly, the check pattern 400A includes a pattern, "store %1, %2," that defines a relationship between the arguments %1 and %2. In the check pattern 400A, the relationship includes storing the argument %1 in memory at the argument %2. The check pattern 400A also includes an action that specifies both a condition, "if (%2==0)," and a replacement instruction % i including an error report call "call report_null_ptr_access." Alternately or additionally, the replacement instruction may include both the condition and the error report call where any generic arguments, e.g., %1, %2, which merely serve as placeholders in the replacement instruction, are filled by the corresponding specific arguments used in the matching instruction. Replacing the matching instruction with the replacement instruction for this and other check patterns allows for symbolic execution of a resulting instrumented intermediate representation in which symbolic execution of a replacement instruction including a call to a specific error report, such as "call report_null_ptr_access" in this example, reports the particular error for inclusion in a resulting report, such as the report 320 of FIG. 3. For example, reporting the particular error for inclusion in the resulting report may include reporting the type of the error based on the called error report and/or reporting a corresponding line of the software program, of the intermediate representation, and/or of the instrumented intermediate representation that caused the error.

The check pattern 400B may be configured to check for divide-by-zero errors. The check pattern 400B includes a pattern, "%3=fdiv %1, %2," that defines a relationship between the arguments %1, %2, and %3. The relationship in the check pattern 400B includes the argument %1 being divided by the argument %2 to generate the argument %3. The check pattern 400B also includes an action that specifies both a condition, "if (%2==0)," and a replacement instruction % i including an error report call "call report_div_by_zero." Alternately or additionally, the replacement instruction may include both the condition and the error report call where any generic arguments, e.g., %1, %2, %3, which merely serve as placeholders in the replacement instruction, are filled by the corresponding specific arguments used in the matching instruction.

The check patterns 400A and 400B are examples of check patterns that may be used according to embodiments described herein to detect common or known errors including, respectively, null-pointer-access errors and divide-by-zero errors. Examples of common or known errors that may be detected using an appropriate check pattern as described herein may include, but are not limited to, logical errors, accessing of illegal memory locations such as null pointer access, uninitialized pointers, divide by zero, out-of-bounds memory access, memory leaks where memory is allocated but never de-allocated, freeing unallocated memory, among others.

Alternately or additionally, check patterns may be used according to embodiments described herein to detect user-defined errors. Check patterns 400C and 400D are examples of check patterns that may be used to detect user-defined errors. In particular, the check pattern 400C may be used to detect whether a range of computation result is less than a threshold value, and the check pattern 400D may be used to detect whether a part of code is executed less than a threshold number of times. Other check patterns may be defined and used to detect other user-defined errors.

A more detailed explanation of the check patterns 400C and 400D will now be provided by way of illustration. The check pattern 400C includes a pattern, "%3=(add|sub|mul) %1, %2," that defines a relationship between the arguments %1, %2, and %3. The relationship in the check pattern 400C includes the argument %2 being added to, subtracted from, or multiplied by the argument %1 to generate the argument %3. The check pattern 400C also includes an action that specifies both a condition, "if (%3>100)," and a replacement instruction % i including an error report call "call report_out_of_range." Alternately or additionally, the replacement instruction may include both the condition and the error report call where any generic arguments, e.g., %1, %2, %3, which merely serve as placeholders in the replacement instruction, are filled by the corresponding specific arguments used in the matching instruction. Thus, the check pattern 400C allows a user to detect whether a range of computation result is less than the threshold value of 100 in this example.

The check pattern 400D includes the same pattern as the check pattern 400C, which has already been described. The check pattern 400D also includes an action that specifies both a condition, "if (user_count>=10)," and a replacement instruction % i including "call report_many_executions." Alternately or additionally, the replacement instruction may include both the condition and the error report call where any generic arguments, e.g., %1, %2, %3, which merely serve as placeholders in the replacement instruction, are filled by the corresponding specific arguments used in the matching instruction. Thus, the check pattern 400D allows a user to detect whether a part of code is executed less than the threshold number of times of 10 in this example.

Each of the check patterns 400 of FIG. 4 includes a single pattern, such as "store %1, %2" in check pattern 400A, "%3=fdiv %1, %2" in check pattern 400B, and "%3=(add|sub|mul) %1, %2" in check patterns 400C and 400D. Alternately, any given check pattern may include multiple patterns that have to be matched by instructions in an intermediate representation of a software program before evaluating a corresponding condition specified in an action of the check pattern. In these and other embodiments, the multiple patterns may be separated by semicolons or other suitable character, or may otherwise be distinguished from each other. The following three lines are examples of three patterns that may be included all in the same check pattern:
%1=load %2;
%3=(add|sub|mul) %1, %4; and
store %3, %5.
The foregoing patterns are provided by way of illustration only and should not be construed to limit the embodiments described herein. For example, a check pattern with multiple patterns may include as few as two patterns, or three or more patterns. Moreover, each of the patterns may include the same patterns described above and/or any other desired pattern.

Additionally, each of the check patterns 400 of FIG. 4 includes a single replacement instruction % i. Alternately or additionally, one or more check patterns may include multiple replacement instructions % i1, % i2, ..., % iN.

Figure 5:
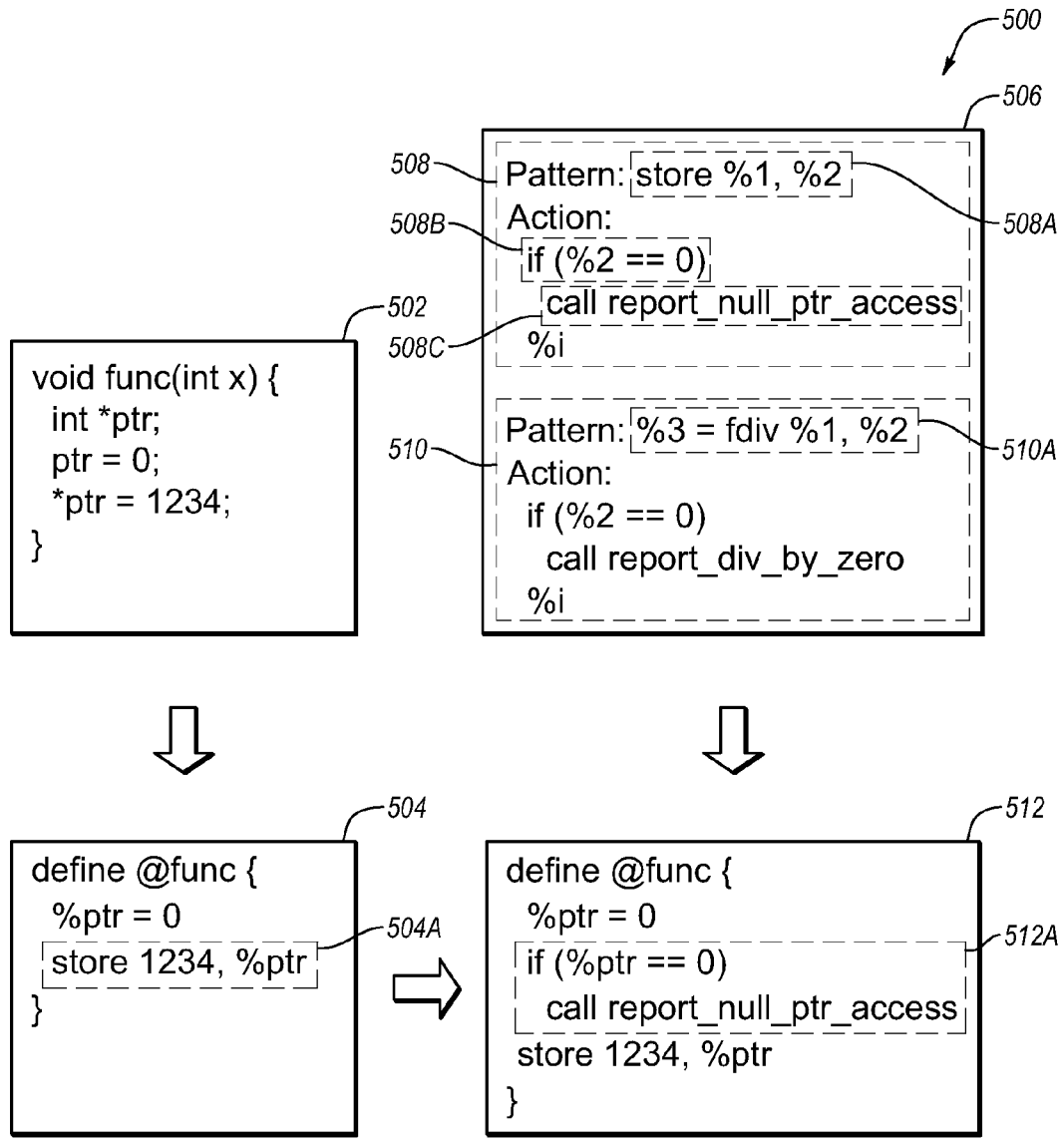
FIG. 5 schematically illustrates a process flow for analyzing software programs using a symbolic execution based dynamic checker.

FIG. 5 schematically illustrates a process flow 500 for analyzing software programs using a symbolic execution based dynamic checker (hereinafter "checker"), arranged in accordance with at least one embodiment described herein. The process flow 500 will be described in the context of the checker 302 of FIG. 3.

The checker 302 receives a software program 502, which is an example implementation of the software program 312 of FIG. 3. The compiler 306 may compile the software program 502 into an intermediate representation 504, which is an example implementation of the intermediate representation 314 of FIG. 3. The assertion instrumentation module 308 receives the intermediate representation 504, and additionally receives one or more check patterns 506, which are an example implementation of the check patterns 316 of FIG. 3.

As illustrated in FIG. 5, the check patterns 506 include a first check pattern 508 for detecting null-pointer-access errors and a second check pattern 510 for detecting divide-by-zero errors. The first check pattern 508 includes a pattern 508A of "store %1, %2" and the second check pattern includes a pattern 510A of "%3=fdiv %1, %2." Accordingly, the assertion instrumentation module 308 searches the intermediate representation 504 for any instructions that match either or both of the patterns 508A, 510A.

In the illustrated embodiment, the assertion instrumentation module 308 finds an instruction 504A in the intermediate representation 504 that matches the pattern 508A. Accordingly, the assertion instrumentation module 308 evaluates whether a condition 508B specified in an action of the pattern 508A is satisfied by an appropriate one or more of the arguments in the instruction 504A. In particular, in the illustrated embodiment, the assertion instrumentation module 308 evaluates whether the second argument, or % ptr, in the instruction 504A is equal to zero. If the condition 508B is not satisfied, the assertion instrumentation module 308 may search for other instructions in the intermediate representation 504 that match the same or other patterns. Because line 2 of the intermediate representation 504 assigns % ptr a value of zero, however, the condition 508B is satisfied.

Thus, the assertion instrumentation module 308 generates an instrumented intermediate representation 512 in which the instruction 504A is modified according to an action specified in the check pattern 508. More particularly, in the illustrated example, the instruction 504A is modified by replacing it in the instrumented intermediate representation 512 with a replacement instruction specified in the action of the check pattern 508, the replacement instruction including both the condition 508B and an error report call 508C, as denoted at 512A (hereinafter "text 512A") in the instrumented intermediate representation 512. As illustrated in FIG. 5, the text 512A includes the replacement instruction specified in the action of the pattern 508A where the argument, or placeholder, %2 of the condition included in the replacement instructions is filled by the corresponding specific argument, or % ptr, used in the instruction 504A.

Figure 6:
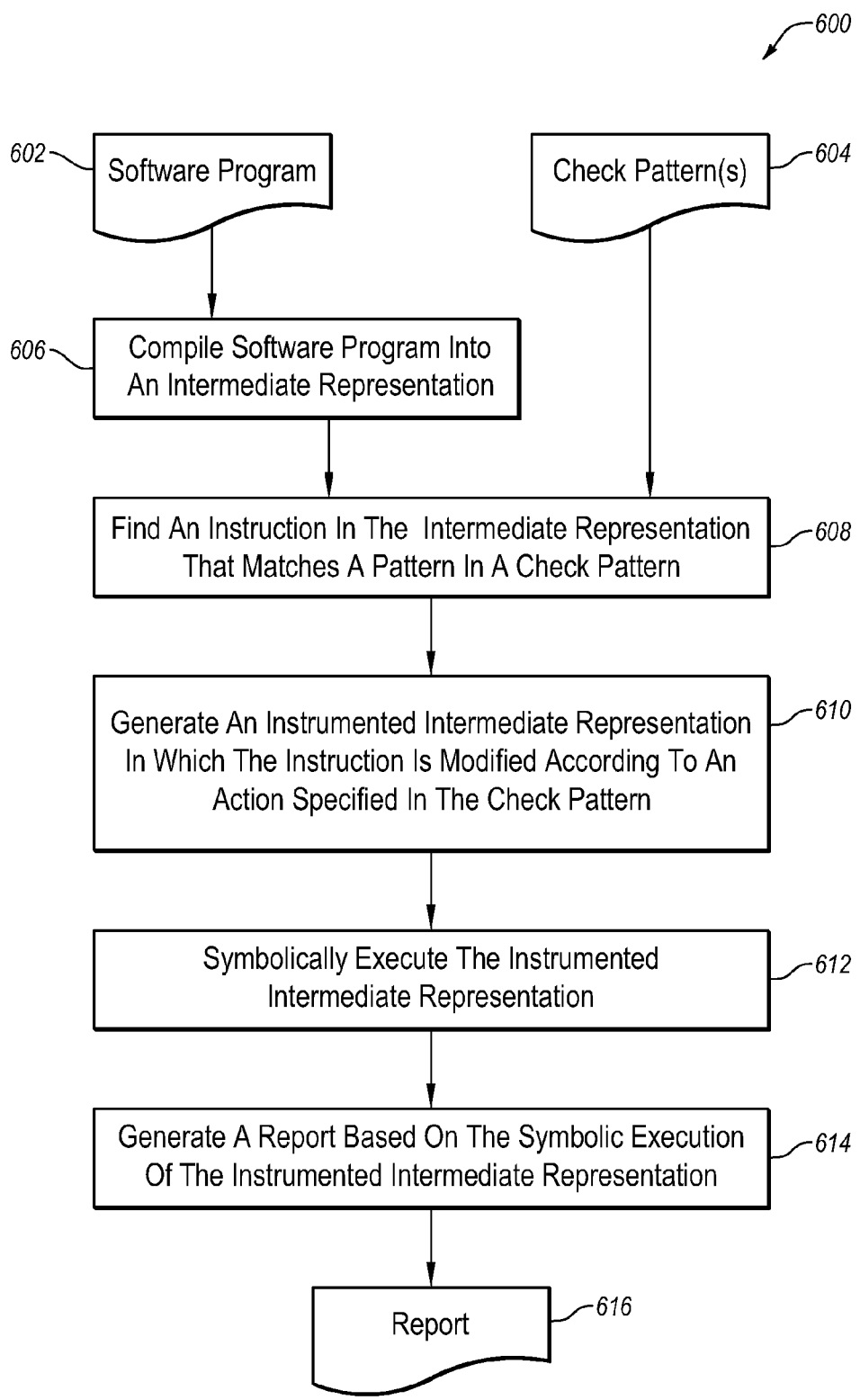
FIG. 6 is a flowchart of an example method of analyzing a software program using a symbolic execution based dynamic checker.

FIG. 6 is a flowchart of an example method 600 of analyzing a software program 602 using a symbolic execution based dynamic checker (hereinafter "checker"), arranged in accordance with at least one embodiment described herein. The method 600 in some embodiments is performed by the checker, such as the checker 202 or 302 of FIG. 2 or 3. Although illustrated as discrete blocks, various blocks may be divided into additional blocks, combined into fewer blocks, or eliminated, depending on the desired implementation. The method 600 may receive both the software program 602 and one or more check patterns 604 as inputs.

The method 600 may begin at block 606 in which a software program is compiled into an intermediate representation.

At block 608, an instruction is found in the intermediate representation that matches a pattern in one of the check patterns 604. Prior to finding the instruction that matches the pattern, the method 600 may generally include searching the intermediate representation for instructions that match one or more patterns in one or more corresponding ones of the check patterns 604.

At block 610, an instrumented intermediate representation is generated in which the instruction is modified according to an action specified in the corresponding one of the check patterns 604. In these and other embodiments, generating an instrumented intermediate representation in which the instruction is modified according to an action specified in the check pattern may include replacing the instruction in the intermediate representation with a replacement instruction included in the check pattern. Moreover, as mentioned above, the pattern may define a relationship between two or more arguments. The action may specify a condition and a replacement instruction to substitute for the instruction in the intermediate representation when the instruction includes two or more arguments having the relationship specified by the pattern and the condition is satisfied.

At block 612, the instrumented intermediate representation is symbolically executed.

At block 614, a report 616 is generated based on the symbolic execution of the instrumented intermediate representation. The report may indicate one or more errors within the software program 602.

Accordingly, some embodiments described herein may allow detectable defect types for a symbolic execution based dynamic checker to be programmed by instrumenting an intermediate representation. Alternately or additionally, some embodiments described herein may represent detectable defect types in pairs of a pattern and a corresponding action.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, the method 600 may further include searching the intermediate representation for instructions that match any of multiple patterns, each of the patterns being included in a corresponding one of multiple check patterns. For each instruction that matches a corresponding one of the patterns, the corresponding instructions from the intermediate representation may be modified according to an action specified in a corresponding one of the check patterns. Additionally, prior to searching the intermediate representation for instructions that match any of the patterns, user input may be received that is effective to select at least a first check pattern from an available set of check patterns to include as one of the multiple check patterns. The method may further include, prior to receiving the user input effective to select at least the first check pattern, receiving user input effective to define the first check pattern. Accordingly, some embodiments described herein allow a user to define check patterns for detecting specific defects and/or selecting one or more check patterns from a database or other repository of check patterns that are considered when analyzing a software program.

Some embodiments described herein include an article of manufacture such as a non-transitory computer-readable medium having computer instructions stored thereon that are executable by a processing device to perform one or more of the operations included in the method 600 of FIG. 6, such as the operations illustrated by blocks 606, 608, 610, 612, and/or 614 in FIG. 6, and/or variations thereof. The non-transitory computer-readable medium and the processing device may be included in the system 300 of FIG. 3, for example.

Figure 7:
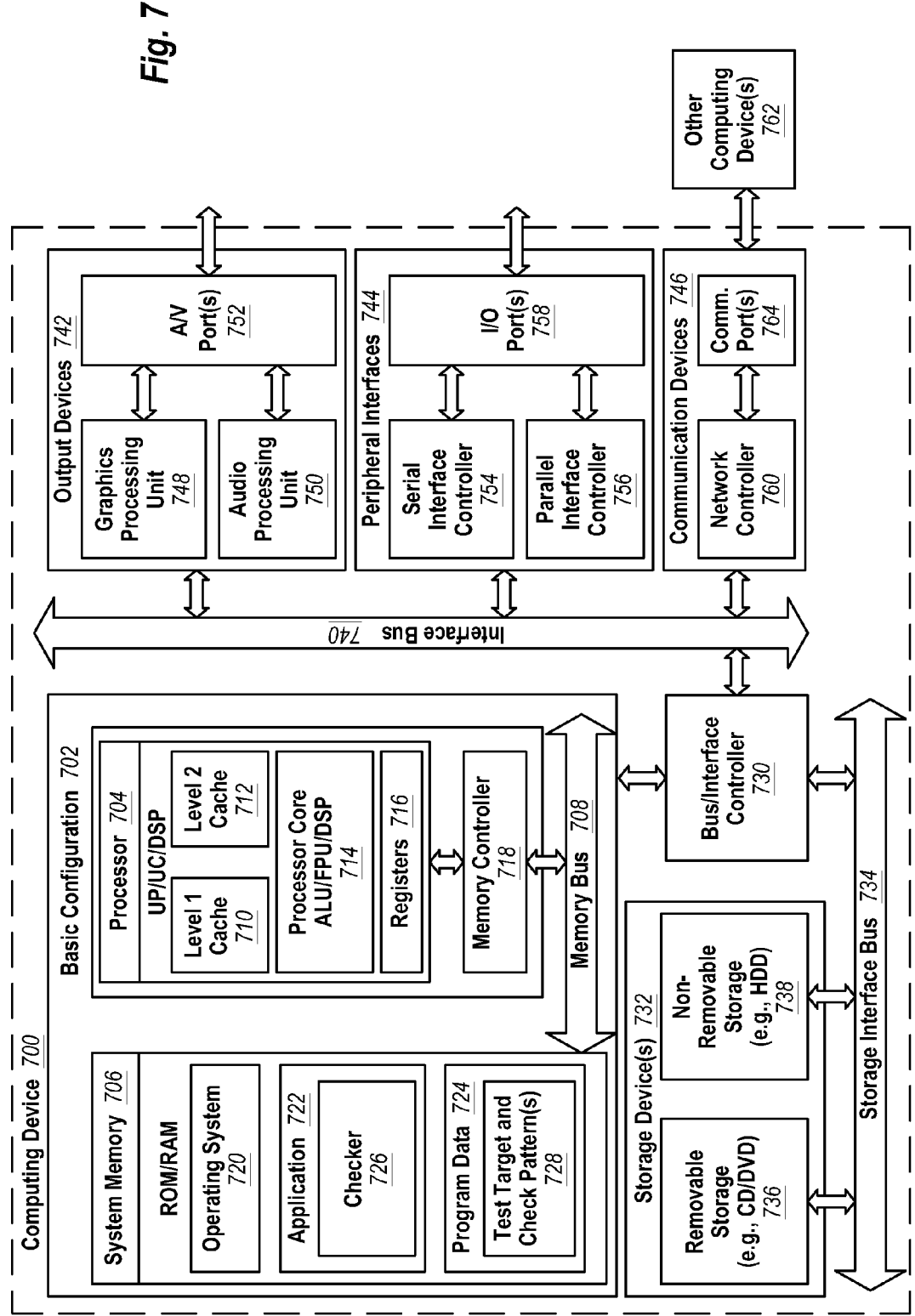
FIG. 7 is a block diagram illustrating an example computing device that is arranged for analyzing a software program using a symbolic execution based dynamic checker.

FIG. 7 is a block diagram illustrating an example computing device 700 that is arranged for analyzing a software program using a symbolic execution based dynamic checker (hereinafter "checker") 726, in accordance with at least one embodiment described herein. The computing device 700 may be included in or correspond to the system 300 of FIG. 3, for example. In a basic configuration 702, the computing device 700 typically includes one or more processors 704 and a system memory 706. A memory bus 708 may be used for communicating between the processor 704 and the system memory 706.

Depending on the desired configuration, the processor 704 may be of any type including, but not limited to, a microprocessor (UP), a controller, a microcontroller (UC), a central processing unit (CPU), a digital signal processor (DSP), any combination thereof, or other suitable processing device. The processor 704 may include one or more levels of caching, such as a level one cache 710 and a level two cache 712, a processor core 714, and registers 716. An example processor core 714 may include an arithmetic logic unit (ALU), a floating point unit (FPU), a DSP core, or any combination thereof. An example memory controller 718 may also be used with the processor 704, or in some implementations the memory controller 718 may be an internal part of the processor 704.

Depending on the desired configuration, the system memory 706 may be of any type including, but not limited to, volatile memory (such as RAM), non-volatile memory (such as ROM, flash memory, etc.), or any combination thereof. The system memory 706 may include an OS 720, one or more applications 722, and program data 724. The application 722 may include the checker 726 that is arranged to perform one or more of the operations or functions as described herein, including operations for analyzing a software program as described with respect to the method 600 of FIG. 6. The program data 724 may include a test target and check pattern(s) 728. The test target may include a software program that is being analyzed by the checker 726, for instance. The test target and check pattern(s) 728 may be analyzed and/or used as described above to detect errors in the test target. In some embodiments, the application 722 may be arranged to operate with the program data 724 on the OS 720 such that implementations of methods of analyzing a software program such as the method 600 of FIG. 6 may be provided as described herein.

The computing device 700 may have additional features or functionality, and additional interfaces to facilitate communications between the basic configuration 702 and other devices and interfaces. For example, a bus/interface controller 730 may be used to facilitate communications between the basic configuration 702 and one or more data storage devices 732 via a storage interface bus 734. The data storage devices 732 may be removable storage devices 736, non-removable storage devices 738, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and non-volatile, removable and non-removable media implemented in any method or technology for storage of information, such as computer-readable instructions, data structures, program modules, or other data.

The system memory 706, removable storage devices 736 and non-removable storage devices 738 are examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which may be used to store the desired information and which may be accessed by the computing device 700. Any such non-transitory computer-readable media may be part of the computing device 700.

The computing device 700 may also include an interface bus 740 for facilitating communication from various interface devices (e.g., output devices 742, peripheral interfaces 744, and communication devices 746) to the basic configuration 702 via the bus/interface controller 730. Example output devices 742 include a graphics processing unit 748 and an audio processing unit 750, which may be configured to communicate to various external devices such as a display or speakers via one or more A/V ports 752. Example peripheral interfaces 744 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 746 includes a network controller 760, which may be arranged to facilitate communications with one or more other computing devices 762 over a network communication link via one or more communication ports 764.

The network communication link may be one example of a communication media. Communication media may typically be embodied by computer-readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term "computer-readable media" as used herein may include both storage media and communication media.

The computing device 700 may be implemented as a portion of a small-form factor portable (or mobile) electronic device such as a cell phone, a personal data assistant (PDA), a personal media player device, a wireless web-watch device, a personal headset device, an application-specific device, or a hybrid device that includes any of the above functions. The computing device 700 may also be implemented as a personal computer, including both laptop computer and non-laptop computer configurations.

All examples and conditional language recited herein are intended for pedagogical objects to aid the reader in understanding the invention and the concepts contributed by the inventor to furthering the art, and are to be construed as being without limitation to such specifically-recited examples and conditions. Although embodiments of the present inventions have been described in detail, it should be understood that the various changes, substitutions, and alterations could be made hereto without departing from the spirit and scope of the invention.

What is claimed is:

1. A processor-implemented method of analyzing a software program, the method comprising:

compiling a software program into an intermediate representation;
finding an instruction in the intermediate representation that matches a pattern in a check pattern;
generating an instrumented intermediate representation in which the instruction is modified according to an action specified in the check pattern by replacing the instruction in the intermediate representation with a replacement instruction included in the check pattern, the replacement instruction including a call to an error report; and
symbolically executing the instrumented intermediate representation.

2. The processor-implemented method of claim 1, wherein:
the pattern defines a relationship between two or more arguments; and
the action specifies a condition and the replacement instruction to substitute for the instruction in the intermediate representation when:
the instruction includes two or more arguments having the relationship specified by the pattern; and
the condition is satisfied.

3. The processor-implemented method of claim 2, wherein:
the two or more arguments include a first argument and a second argument;
the pattern includes the first argument being stored in memory at the second argument;
the condition includes the second argument being equal to zero;
the replacement instruction includes the call to the error report; and
the error report comprises a null-pointer-access report.

4. The processor-implemented method of claim 2, wherein:
the two or more arguments include a first argument, a second argument, and a third argument;
the pattern includes dividing the first argument by the second argument to generate the third argument;
the condition includes the second argument being equal to zero;
the replacement instruction includes the call to the error report; and
the error report comprises a divide-by-zero report.

5. The processor-implemented method of claim 2, wherein the condition includes a condition defined by a user, the replacement instruction includes the call to the error report, and the error report comprises a report defined by the user.

6. The processor-implemented method of claim 1, further comprising generating a report based on the symbolic execution of the instrumented intermediate representation, the report indicating one or more errors within the software program.

7. The processor-implemented method of claim 1, further comprising:
searching the intermediate representation for instructions that match any of a plurality of patterns, each of the plurality of patterns being included in a corresponding one of a plurality of check patterns;
for each instruction that matches a corresponding one of the plurality of patterns, modifying the corresponding instruction from the intermediate representation according to an action specified in a corresponding one of the plurality of check patterns; and
prior to searching the intermediate representation for instructions that match any of the plurality of patterns, receiving user input effective to select at least a first check pattern from an available set of check patterns to include as one of the plurality of check patterns.

8. The processor-implemented method of claim 7, further comprising, prior to receiving user input effective to select at least the first check pattern, receiving user input effective to define the first check pattern.

9. A system for analyzing a software program, the system comprising:
a processing device;
a non-transitory computer-readable medium having stored thereon:
a compiler executable by the processing device to compile a software program into an intermediate representation;
an assertion instrumentation module executable by the processing device to:
find an instruction in the intermediate representation that matches a pattern in a check pattern; and
generate an instrumented intermediate representation in which the instruction is modified according to an action specified in the check pattern by replacing the instruction in the intermediate representation with a replacement instruction included in the check pattern, the replacement instruction including a call to an error report; and
a symbolic execution module executable by the processing device to symbolically execute the instrumented intermediate representation.

10. The system of claim 9, wherein:
the pattern defines a relationship between two or more arguments; and
the action specifies a condition and the replacement instruction to substitute for the instruction in the intermediate representation when:
the instruction includes two or more arguments having the relationship specified by the pattern; and
the condition is satisfied.

11. The system of claim 10, wherein:
the two or more arguments include a first argument and a second argument;
the pattern includes the first argument being stored in memory at the second argument;
the condition includes the second argument being equal to zero;
the replacement instruction includes the call to the error report; and
the error report comprises a null-pointer-access report.

12. The system of claim 10, wherein:
the two or more arguments include a first argument, a second argument, and a third argument;
the pattern includes dividing the first argument by the second argument to generate the third argument;
the condition includes the second argument being equal to zero;
the replacement instruction includes the call to the error report; and
the error report comprises a divide-by-zero report.

13. A non-transitory computer-readable medium having computer instructions stored thereon that are executable by a processing device to perform operations for analyzing a software program, the operations comprising:
compiling a software program into an intermediate representation;
finding an instruction in the intermediate representation that matches a pattern in a check pattern;

generating an instrumented intermediate representation in which the instruction is modified according to an action specified in the check pattern by replacing the instruction in the intermediate representation with a replacement instruction included in the check pattern, the replacement instruction including a call to an error report; and symbolically executing the instrumented intermediate representation.

14. The non-transitory computer-readable medium of claim 13, the operations further comprising generating a report based on the symbolic execution of the instrumented intermediate representation, the report indicating one or more errors within the software program.

15. The non-transitory computer-readable medium of claim 13, the operations further comprising:

searching the intermediate representation for instructions that match any of a plurality of patterns, each of the plurality of patterns being included in a corresponding one of a plurality of check patterns;

for each instruction that matches a corresponding one of the plurality of patterns, modifying the corresponding instruction from the intermediate representation according to an action specified in a corresponding one of the plurality of check patterns; and prior to searching the intermediate representation for instructions that match any of the plurality of patterns, receiving user input effective to select at least a first check pattern from an available set of check patterns to include as one of the plurality of check patterns.

16. The non-transitory computer-readable medium of claim 15, the operations further comprising, prior to receiving user input effective to select at least the first check pattern, receiving user input effective to define the first check pattern.

* * * * *